United States Patent [19]
Dvorak

[11] 3,899,950
[45] Aug. 19, 1975

[54] BAR SHEAR
[76] Inventor: Jim Dvorak, Cosmos, Minn. 56228
[22] Filed: Sept. 6, 1974
[21] Appl. No.: 503,966

[52] U.S. Cl. .................. 83/588; 83/599; 83/602; 83/642
[51] Int. Cl.² ............... B26D 5/08; B26D 9/00
[58] Field of Search ......... 83/642, 588, 602, 599, 83/624

[56] References Cited
UNITED STATES PATENTS

| | | | |
|---|---|---|---|
| 249,831 | 11/1881 | Gault | 83/642 X |
| 345,358 | 7/1886 | Boehme | 83/624 |
| 959,674 | 5/1910 | Woodward | 83/642 X |
| 2,808,883 | 10/1957 | Knokey | 83/642 X |
| 2,868,290 | 1/1959 | Felton | 83/642 |
| 3,263,541 | 8/1966 | Stockard, Jr. | 83/599 X |

Primary Examiner—Frank T. Yost

[57] ABSTRACT

A bar shear is provided including a pair of side plates and an intermediate moveable plate. The moveable plate includes a circular aperture accommodating a disc. A shaft means offset from the center of the disc causes movement of the moveable plate as the discs are rotated about the offset shaft means. Cooperable notches are provided in the side plates and moveable plate. Upon movement of the moveable plate, a bar or strip of metal or the like is sheared off by the moveable plate.

11 Claims, 8 Drawing Figures

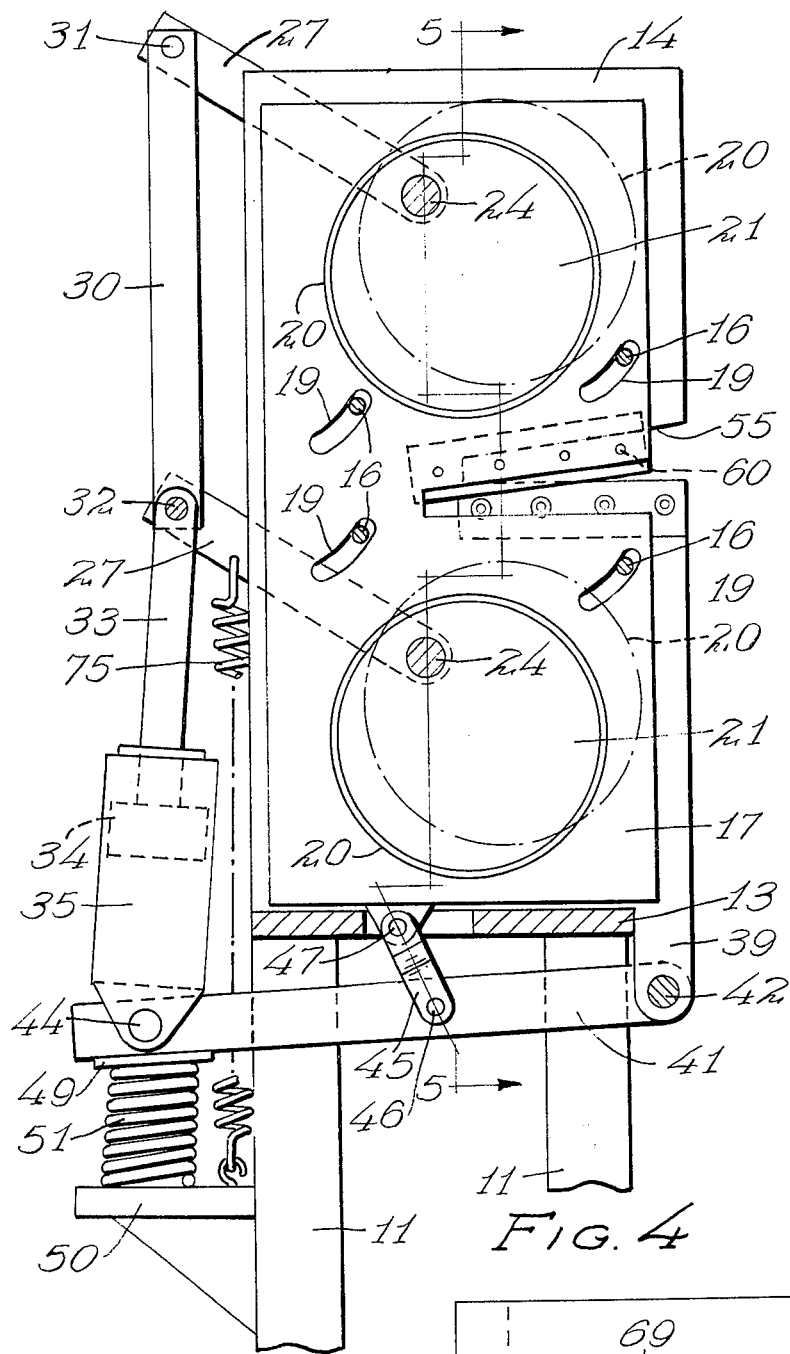
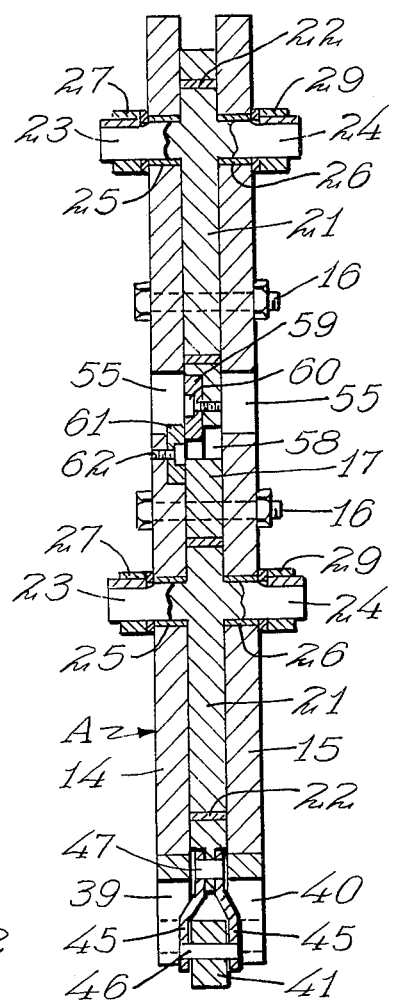
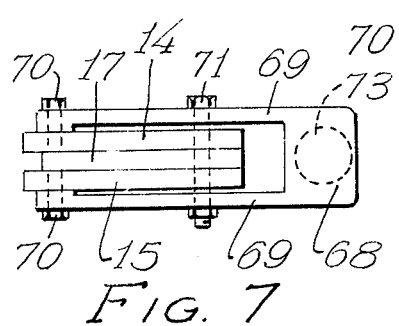
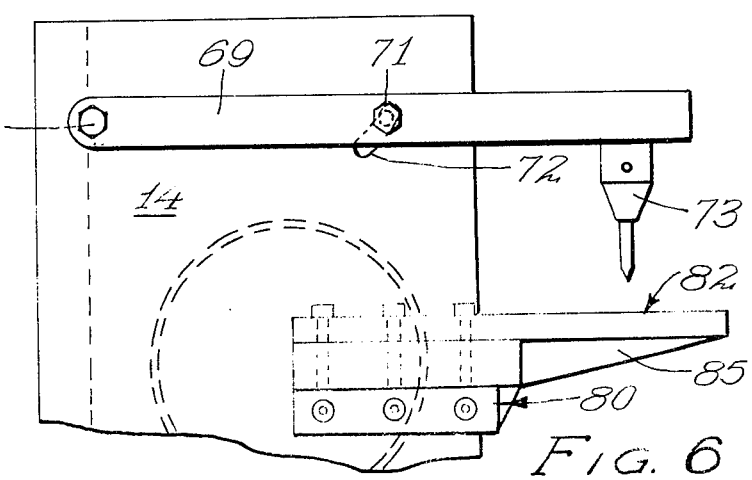
FIG. 4
FIG. 5
FIG. 7
FIG. 6

BAR SHEAR

This invention relates to an improvement in bar shear and deals particularly with an apparatus for cutting off bars or strips of metal and the like.

BACKGROUND OF THE INVENTION

Various types of bar shears have been produced. Most of these comprise structures having heavy cast iron frames and a pair of jaws in which one is fixed and the other pivoted. By movement of the pivoted jaw relative to the fixed jaw, a bar or strip of metal may be cut off to a suitable length.

Bar shears are normally very costly due to their bulk. A feature of the present invention resides in the provision of a bar shear which may be much simpler and less expensive to produce.

SUMMARY OF THE INVENTION

The present inventon resides in the provision of a bar shear including a suitable stand, and which includes a fixed side plate, a movable center plate, and a removable side plate similar to the first, and movable plate being sandwiched between the two side plates. The movable plate is provided with one or more circular apertures therethrough of relatively large diameter. A disc is supported in each said aperture, and each disc is rotatably or pivotally supported by suitable bearings encircling the disc which is preferably the same thickness as the movable plate. A shaft is positioned eccentrically with respect to the center of the circular plate this shaft being either keyed to the circular disc or integral therewith. The shaft is supported by fixed bearings in the side plate. An arm is secured to each end of the shaft, the arms being parallel and extending beyond one side of the plates. The arms extend in a direction which is other than in a radial direction from the center of the disc or discs. Pivotal movement of the arms rotates the disc or discs, moving the movable plate in a downward direction.

In the particular arrangement illustrated, the moveable plate includes two circular apertures of equal size which accommodate circular discs of equal size. The shafts which extend through the fixed side plates are located in the same relative position on each of the discs. The arms which are keyed to the ends of the shafts are arranged in parallel pairs extending in a generally lateral direction to points beyond the plates. A link extends between the arms of one of the pairs to a point between the parallel arms of the other pair. Pivots connect the links to the arms so that the pairs of arms move in unison, and rotate the discs in unison. A hydraulic or pneumatic cylinder is connected to the lower end of the link for pivoting the pairs of arms in unison. By operation of the piston within the cylinder, the arms are pivoted, rotating the discs within their apertures in the moveable plate, and moving the plate in a generally vertical direction.

The sides of the plates opposite the side past which the arms extend are slotted to accommodate a bar or strip of metal or the like. A hardened shear blade is connected to the moveable plate with the shearing edge generally coinciding with the upper edge of the notch. One of the side plates is also provided with a shearing blade having its upper edge projecting into the notch. The shearing blades are preferably made of hardened steel or the like and are detachably secured in position so that they can be removed and replaced. As the moveable plate is lowered, the lower edge of the upper blade passes the upper edge of the lower blade, shearing off the bar or strip of metal which has been inserted in the slot between the blades.

An added feature of the invention lies in the fact that the side plates include downwardly projecting arms which extend downwardly from the notched edges of the these plates. A lever arm is pivotally connected between these arms, and extends across the machine to the opposite side thereof. The hydraulic cylinder includes a downwardly extending pair of lugs which are pivotally connected to the lever arm. Links are pivotally connected to the lever arm intermediate its ends, and these links are pivoted at their upper ends to the moveable plate. As a result the expansion of the piston, cylinder device acts to assist in pulling the moveable plate downwardly as the discs are rotated within this plate.

A further feature of the present invention resides in the provision of a spring which assists the cylinder in returning the moveable plate to its starting position. if desired, the spring may comprise the only means of returning the bar shear to its starting position.

A feature of the present invention resides in the fact that the structure lends itself very well to the use of other means for acting upon a bar or strip of material. For example, a mandrel may be secured to the side plates, and a punch may be secured to the side plates for movement in conjunction therewith for punching a hole in the bar or strip of material.

These and other objects and novel features of the present invention will be more clearly and fully set forth in the following specification and claims.

BRIEF DESCRIPTION OF THE DRAWINGS

FIG. 4 is a side elevational view of the apparatus with the removeable side plate removed to show the construction.

FIG. 5 is a vertical sectional view through the apparatus, the position of the section being indicated by the line 5—5 thereof.

FIG. 6 is an elevational view of a modified form of construction.

FIG. 7 is a plan view of the modified construction in reduced size.

DESCRIPTION OF THE PREFERRED EMBODIMENTS

Figure 1:
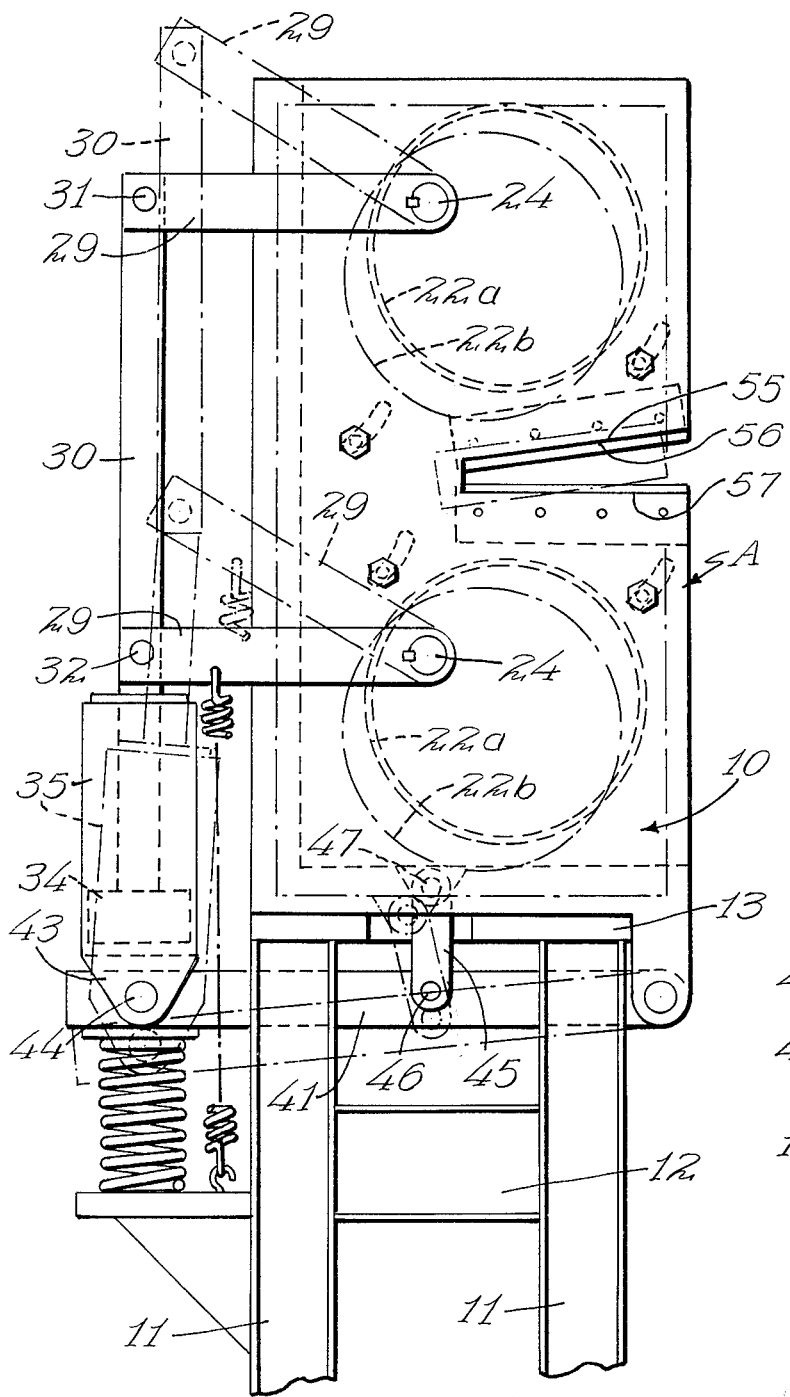
FIG. 1 of the drawings is a side elevational view of the apparatus, showing the general construction thereof.

The bar shear is indicated in general by the numeral 10, and which is supported by four channel-shaped legs 11 connected by a cross member 12 shown in FIG. 1. The plate 13 is supported at the top of the legs 11, and act to support the body 10.

As is indicated in FIG. 5 of the drawings, the body includes a fixed side plate 14 which is fixed relative to the supporting plate 13, and a removeable plate 15, the two plates being secured together by bolts 16. A moveable plate 17 is slideably supported between the side plates 14 and 15. The moveable plate 17 is provided with slots 19 through which the bolts 16 extend. The moveable plate 17 is provided with a pair of circular apertures 20 extending therethrough. In certain instances, one of these apertures may be omitted or additional such apertures may be added where additional force is required to operate the shear. Discs 21 are rotatably supported in the apertures 20 and bearings 22 may be provided for supporting the discs 21. While the bearings are shown as solid rings, in actual practice these are preferably needle bearings or the like.

A pair of opposed shafts 23 and 24 extend from each disc 21 at a point spaced from the axis of the disc. Alternatively, the shafts 23 and 24 may extend through apertures in the disc 21 and be keyed to the disc through which it extends. The shafts 23 extend through the fixed side plate 14 which is preferably provided with bearings such as 25. The shafts 24 extend through the removable side plate 15 which also is preferably provided with supporting bearings 26. An arm 27 is keyed to each shaft 23, and a parallel arm is keyed to each shaft 24, the arms which are keyed to each shaft 23 being in spaced parallel relation to the arms connected to the corresponding shafts 24. In view of the fact that the removable side plate 15 has been removed in FIG. 4 of the drawings, the arms 27 are shown in FIG. 4, while arms 29 are shown in the side elevational view of FIG. 1 of the drawings.

Links 30 are pivotally connected at 31 to the arms 27 and 29 of the upper disc 21, while the links are also pivotally connected at 32 to the lower set of arms 27, 29. The lower end of the links 30 are notched to accommodate the upper end of the piston rod 33 connected to the piston 34 in the cylinder 35. Thus, the piston 34 in the cylinder 35 acts to move the links 30 from the position shown in solid lines in FIG. 1 of the drawings to the position shown in broken lines in this figure. This movement of the links 30 swings the arms 27, 29 from the position shown in full lines in FIG. 1 to the position shown in dotted outline in these figures.

FIG. 4 shows the discs 21 in the position in which they are located near the completion of the cutting stroke. The dotted outline shows the position of the discs 21 when the slidable plates 17 are in raised position. This feature is also shown in FIG. 1 in which the dotted lines 22a show the position of the discs when the arms 29 and 27 are in the full line position shown in FIG. 1 and the broken line 22b shows the position of the discs when the arms 27, 29 are in the dotted line position shown in FIG. 1.

Figure 2:
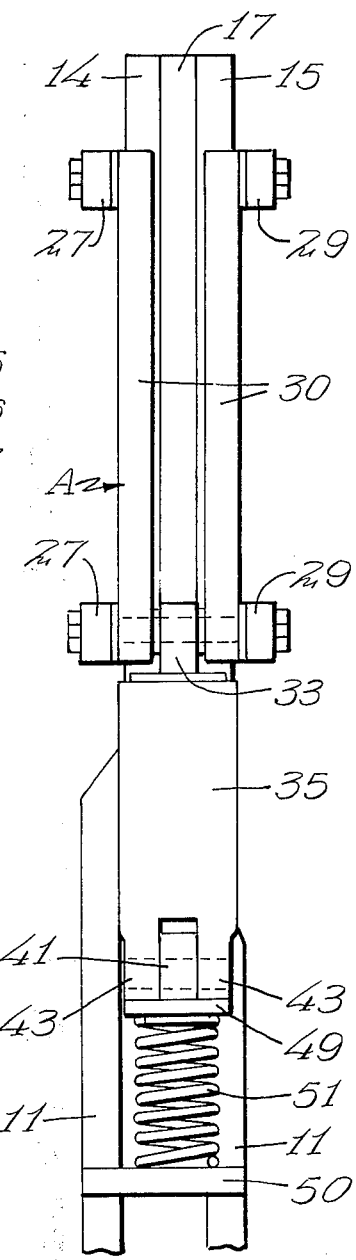
FIG. 2 is a rear elevational view of the bar shear.
Figure 3:
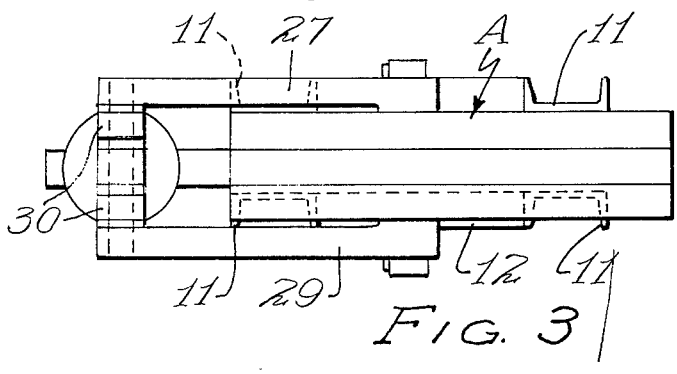
FIG. 3 is a top plan view thereof.

The side plates 14 and 15 are provided with downwardly extending opposed projections 39 and 40. A lever arm 41 is pivotally supported at 42 to the projections 39 and 40 and extends across the device beneath the plate 13. As is indicated in FIG. 2 of the drawings, the cylinder 35 is provided with spaced downwardly projecting lugs 43 between which the lever arm 41 extends. A pivot 44 extends through the lugs 43 and through the lever 41 to pivotally connect the cylinder to the lever 41.

Intermediate the ends of the lever 41, links 45 are pivotally connected at 46 to the lever 41, and the links 45 are pivotally connected at 47 to the moveable plate 17. A bearing plate 49 is mounted upon the lever 41 beneath its pivotal attachment 44 to the cylinder 35. A shelf 50 projects rearwardly from the rear legs 11, and a spring 51 is interposed between the shelf and the plate 49. This spring 51 resists downward swinging of the lever 41, and also assists in returning the lever 41 to its starting position.

Actuation of fluid within the cylinder 35 causes the various lever arms 27, 29 to rotate the shafts 23, 24 to which they are keyed. This causes rotation of the discs 21 not about their centers, but about the axis of the aligned shafts 23, 24. This causes a downward movement of the moveable plate when the cylinder is expanded from the position shown in full lines in FIG. 1 of the drawings to the position shown in dotted outline in this Figure. Downward movement of the moveable plate acts to shear a bar or strip of material in a manner which will be described.

In FIG. 1 of the drawings, the side plates 14 and 15 are slotted as indicated at 55, the slot having a slightly downwardly and rearwardly extending edge 56, and a substantially horizontal lower edge 57. The moveable plate is provided with a corresponding notch 58. With reference platform FIG. 5 of the drawings, an upper shearing blade 59 is bolted or otherwise secured extending into the notch 58 to the moveable plate 17 as indicated at 60. A cooperable shearing blade 61 is bolted or otherwise secured as indicated at 62 to the side plate 14. Downward movement of the moveable plate 17 causes the upper blade 59 to move past the fixed cooperable blade 61 and to shear a bar or strip of material inserted in the slots 55 and 58 between the blades when the blades are in the open full line position shown in FIG. 1.

Figure 8:
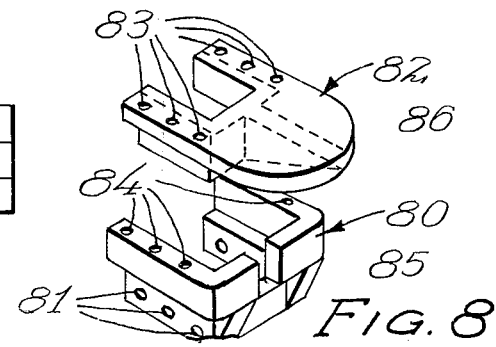
FIG. 8 is a perspective view of the attachments which may be used for adding a tool to the bar shear shown in FIGS. 1 through 5.

As indicated in FIGS. 6, 7 and 8 of the drawings, a generally U-shaped adapter 80 may be bolted to the side plates 14 and 15, the bolt holes being indicated at 81. A punch press plateform 82 may be secured to the adapter through bolts extending through the apertures 83 and into apertures 84 the adapter. A notch 85 is provided in the adapter to accommodate the gusset plate 86 which reinforces the punch plate. The punch plate may be varied to suit the purpose of which is is intended.

As indicated in FIGS. 6 and 7, a punch support 69 is pivotally secured to the side plates 14 and 15 by pivot bolts 70. Bolts 71 extend through the opposite arms of the punch 69 and through a slot 72 in the side plates 14 and 15, the bolt extending through a hole in the central slideable plate 17. As indicated, the arms on the opposite sides of the plates are connected at their outer ends as indicated at 68 and support a punch 73 or other such tool. Downward movement of the plate 17 will pivot the punch 69 downwardly tp punch a hole through a bar or strip of metal resting upon THE PLATFORM 82.

The present device is believed to be unique in that it employs circular discs for moving the slideable plate upwardly and downwardly. The discs are rotated about an axis which is offset from the axis of the discs so that the disc, as well as the moveable plate, may be moved in a downward direction in addition to a relatively short lateral direction. The extent of the lateral movement of the slideable plate depends upon the location of the shafts 23 and 24 relative to the center of the discs. In other words, if the shafts 23, 24 are positioned slightly below the center of the discs, and the arms 27, 29 extend laterally therefrom, the lateral movement of the moveable plate is very slight. Thus, the position of the shafts 23, 24 when the slot 55 is open varies the degree of lateral movement. In the position illustrated, there is sufficient lateral movement of the slideable plate to create a shearing action by moving the shearing blade laterally as it decends. If this is not desired, the position of the shafts 23, 24 may be varied so that there is very little lateral movement of the moveable plate as it is lowered. The cylinder 35 is double acting, or else a spring 75 is provided between the arms 27, 29 and the frame to return the discs 21 to starting position.

In accordance with the Patent Statutes, I have described the principles of construction and operation of my Bar Shears, and while I have endeavored to set forth the best embodiments, I desire to have it understood that obvious changes may be made within the scope of the following claims without departing from the spirit of my invention.

I claim:

1. A bar shear including:
   a slide plate having a notch in one side thereof,
   a moveable plate having a cooperable notch in one side thereof registrable with said notch in said side plate in one position thereof,
   said moveable plate having a circular aperture extending therein,
   a disc pivotally moveable in said aperture,
   a pivot shaft fixed on said disc offset from the center thereof and extending through said side plate,
   means for pivoting said pivot to move said moveable plate relative to said fixed plate and to move the notch in said moveable plate out of registry with said notch in said side plate to shear off a member inserted in said notch.

2. The structure of claim 1 and including a second side plate on the opposite sides of said moveable plate from said first mentioned side plate and including a notch in registering relation with the notch in said first mentioned side plate.

3. The structure of claim 1 and in which said means for pivoting said pivot includes an arm secured to said pivot shaft, and means for rotating said arm to rotate said disc about the axis of said offset pivot.

4. The structure of claim 2 and in which said means for pivoting said pivot includes an arm secured to said pivot shaft, and means for rotating said arm to rotate said disc about the axis of said offset pivot shaft.

5. The structure of claim 4 and in which said shaft extends through both of said side plates, and a parallel arm on said shaft outwardly of said second plate to which said means for rotating said arm is secured.

6. The structure of claim 1 and in which said moveable plate includes a second circular aperture, second disc, and second pivot shaft similar to the first and including means for pivoting said second disc in unison with said first mentioned pivoting means.

7. The structure of claim 1 and including cooperable cutting jaws on said moveable plate and on said side plate on opposite sides of the notches therein.

8. The structure of claim 3 and in which said means for rotating said arm includes a link, and a cylinder, piston device for actuating said link.

9. The structure of claim 8 and including a lever arm pivotally connected at one end to said side plate and to said cylinder, piston device at its other end, and link means connecting said lever arm intermediate its end to said moveable plate.

10. The structure of claim 9 and including resilient means resisting pivotal movement of said lever arm by said cylinder, piston means.

11. The structure of claim 2 and including a punch press platform detachably connected to said side plates, and a punch pivotally secured to said side plates and connected to said moveable plate for moving the punch upon movement of said moveable plate.

* * * * *